(12) United States Patent
Chong et al.

(10) Patent No.: US 8,095,783 B2
(45) Date of Patent: Jan. 10, 2012

(54) MEDIA BOOT LOADER

(75) Inventors: Benedict Chong, San Jose, CA (US);
Kyungshin Noh, Seoul (KR); Rajeesh Padmanabhan, Santa Clara, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 771 days.

(21) Appl. No.: 10/842,780

(22) Filed: May 11, 2004

(65) Prior Publication Data
US 2005/0005197 A1 Jan. 6, 2005

Related U.S. Application Data

(60) Provisional application No. 60/470,165, filed on May 12, 2003.

(51) Int. Cl.
*G06F 15/177* (2006.01)
(52) U.S. Cl. .......................................................... 713/2
(58) Field of Classification Search ................... 713/2
See application file for complete search history.

(56) References Cited

U.S. PATENT DOCUMENTS

| | | | |
|---|---|---|---|
| 5,029,077 A | 7/1991 | Fatahalian et al. | 364/200 |
| 5,136,711 A * | 8/1992 | Hugard et al. | 713/2 |
| 5,928,348 A | 7/1999 | Mukai et al. | 710/263 |
| 6,154,836 A * | 11/2000 | Dawson et al. | 713/1 |
| 6,263,396 B1 | 7/2001 | Cottle et al. | 710/263 |
| 6,317,828 B1 * | 11/2001 | Nunn | 713/2 |
| 6,356,284 B1 | 3/2002 | Manduley et al. | 345/779 |
| 6,362,836 B1 | 3/2002 | Shaw et al. | 345/744 |
| 6,367,074 B1 | 4/2002 | Bates et al. | 717/11 |
| 6,373,498 B1 | 4/2002 | Abgrall | 345/619 |
| 6,393,560 B1 | 5/2002 | Merrill et al. | 713/2 |
| 6,438,750 B1 | 8/2002 | Anderson | 717/178 |
| 6,449,682 B1 | 9/2002 | Toorians | 711/100 |
| 6,453,469 B1 | 9/2002 | Jystad | 717/174 |
| 6,496,847 B1 | 12/2002 | Bugnion et al. | 709/1 |
| 6,519,659 B1 | 2/2003 | Stevens | 710/15 |
| 6,560,702 B1 | 5/2003 | Gharda et al. | 713/2 |
| 6,564,318 B1 | 5/2003 | Gharda et al. | 713/2 |
| 6,578,142 B1 | 6/2003 | Anderson et al. | 713/2 |
| 6,622,169 B2 | 9/2003 | Kikinis | 709/220 |
| 6,633,976 B1 | 10/2003 | Stevens | 713/2 |

(Continued)

FOREIGN PATENT DOCUMENTS
EP 0 197 552 10/1986

OTHER PUBLICATIONS

Negus, Christopher, "*Linux® Toys II, 9 Cool New Projects for Home, Office and Entertainment*," Wiley Publ'g, Inc., excerpts from Chapter 5.

(Continued)

*Primary Examiner* — Kim Huynh
*Assistant Examiner* — Eric Chang
(74) *Attorney, Agent, or Firm* — K&L Gates LLP

(57) ABSTRACT

A method for boot media loader that includes detecting bootable media independent of any media partitioning. When bootable media is detected, data is read from a predetermined location of the bootable media. Next, the file system type is determined from the read data. The boot loader code is loaded for the corresponding file system type from basic input and output system (BIOS) code, and execution control is transferred to the boot loader code.

20 Claims, 6 Drawing Sheets

U.S. PATENT DOCUMENTS

| | | | | |
|---|---|---|---|---|
| 6,687,819 B1 * | 2/2004 | Aguilar et al. | | 713/2 |
| 6,715,043 B1 | 3/2004 | Stevens | | 711/154 |
| 6,748,511 B2 | 6/2004 | Nichols | | 711/173 |
| 6,763,458 B1 | 7/2004 | Watanabe et al. | | 713/100 |
| 6,765,788 B2 | 7/2004 | Wu | | 361/680 |
| 6,772,313 B2 | 8/2004 | Oh | | 711/173 |
| 6,779,109 B2 | 8/2004 | Stevens | | 713/1 |
| 6,822,843 B2 * | 11/2004 | Jitsukawa | | 361/118 |
| 6,854,009 B1 | 2/2005 | Hughes | | 709/220 |
| 6,948,058 B2 | 9/2005 | Tung | | 713/2 |
| 7,010,627 B2 | 3/2006 | Lin | | 710/67 |
| 7,072,950 B2 | 7/2006 | Toft | | 709/219 |
| 7,076,644 B2 | 7/2006 | Hsu | | 713/1 |
| 7,076,646 B2 | 7/2006 | Chang | | 713/1 |
| 7,082,526 B2 | 7/2006 | Chang | | 713/2 |
| 7,089,410 B2 * | 8/2006 | Sato et al. | | 713/1 |
| 7,185,189 B2 | 2/2007 | Stevens | | 713/2 |
| 7,207,039 B2 | 4/2007 | Komarla et al. | | 717/178 |
| 2002/0133702 A1 | 9/2002 | Stevens | | 713/163 |
| 2002/0138680 A1 | 9/2002 | Stevens | | 710/260 |
| 2002/0157001 A1 | 10/2002 | Huang et al. | | 713/2 |
| 2002/0162052 A1 | 10/2002 | Lewis | | 714/36 |
| 2003/0018892 A1 | 1/2003 | Tello | | 713/164 |
| 2003/0037237 A1 | 2/2003 | Abgrall et al. | | 713/166 |
| 2003/0097553 A1 | 5/2003 | Frye, Jr. | | 713/2 |
| 2003/0163610 A1 | 8/2003 | Stevens | | 710/8 |
| 2004/0039924 A1 | 2/2004 | Baldwin et al. | | 713/189 |
| 2004/0076043 A1 | 4/2004 | Boals et al. | | 365/200 |
| 2004/0225876 A1 | 11/2004 | Lam | | 713/2 |
| 2005/0108585 A1 | 5/2005 | Yang | | 713/310 |

OTHER PUBLICATIONS

"*Red Hat Linux, The Official Red Hat Linux Users Guide*," Red Hat Software, Inc. (Rev. 4, Aug. 1996) excerpts from Chapters 1, 2.

"*Preboot Execution Environment (PXE) Specification*," Intel Corp., Version 2.1, Sep. 20, 1999.

Jun. 6, 2002 screenshots from www.eleaent.com, available at www.archive.org.

Singer, Michael, "*Lindows Launches its 'Media Computer*,'" Jan. 28, 2003, available at www.internetnews.com/bus-news/print.php/1575991.

"*Desktop Linux Leaders to Hold Summit*," Oct. 24, 2002, available at www.desktoplinux.com/news/NS7709909925.

"*Elegent to Power Lindows Media Computer, etDVD and Lindows.com Technology Combine to Create Low-Cost Media Computer*," Jan. 30, 2003, PRNewswire-FirstCall.

Press Release, "*Compact, low-cost DVD, high fidelity music player and personal computer*," Jan. 28, 2003, available at http://web.archive.org/web/20030207211013/www.lindows.com/lindows_news_pressreleases_archives.php?id+37.

1999-2000 screenshots from www.blueskyinnovations.com available at www.archive.org.

PCT International Preliminary Report on Patentability for International Patent Application No. PCT/US2005/029682, mailed Apr. 5, 2007.

PCT International Search Report, for International Patent Application No. PCT/US2005/029682, mailed Feb. 6, 2006.

PCT Written Opinion of the International Searching Authority for International Patent Application No. PCT/US2005/029682, mailed Feb. 6, 2006.

\* cited by examiner

FIG. 4

If (WORD at offset[016h] == ZERO) then it is FAT32
Else
{
    If(WORD at offset[013h]== ZERO) then it is FAT16)
    Else
    {
        Total Sectors per disk = WORD at offset[013h]
        Reserved Sectors = WORD at offset[0eh]
        Sectors per FAT = WORD at offset[016h]
        Number of FAT = BYTE at offset[010h]
        Total clusters = Total Sectors per disk – Reserved Sectors – (Sectors per FAT
            / Number of FAT)
        If Total clusters < 4084, then if is FAT12
        Else it is FAT16

MEDIA BOOT LOADER

This application claims the benefit of U.S. Provisional Application No. 60/470,165, filed on May 12, 2003.

FIELD OF THE INVENTION

The present invention generally relates to boot systems and, more particularly, to a method and apparatus for providing a media boot loader.

BACKGROUND OF THE INVENTION

Electronic devices, for example, personal computers (PC's), laptop computers, MP3 Players, tablet computers and other suitable devices and combinations thereof utilize Basic Input Output System (BIOS) software to perform a boot operation. The BIOS software is typically maintained on a read-only memory (ROM) chip of the electronic device (often referred to as ROM BIOS). Because random-access memory (RAM) is faster than ROM, many electronic devices employ a technique known as 'shadowing,' in which the BIOS is copied from ROM to RAM each time the device is booted.

An industry standard was created so that electronic devices that include processors would typically look in the same place in memory to find the start of the BIOS software. In particular, the BIOS software is typically located in a special reserved memory area near the end of system memory (e.g., beginning at address FFFF0h). Since there are only 16 bytes left from there to the end of conventional memory, this address will typically contain a "jump" instruction which indicates to the processor where the actual BIOS code is located. From this location, processors get their first instructions and begin to execute the BIOS code. The BIOS code typically begins the system boot sequence by performing a power-on self test (POST) and initializing and configuring the device hardware.

After performing the POST operation and initializing certain hardware, the BIOS begins searching for media to boot from. Most modern BIOS software contains a setting that controls if the device should first try to boot from the floppy disk or first try the hard disk. Having identified the target boot drive, the BIOS looks for boot information to start the operating system boot process. If it is searching a partitioned media (e.g., hard disk), the BIOS will look for a master boot record (MBR) at cylinder 0, head 0, sector 1 (the first sector on the disk). The MBR typically contains a partition table and generally also has a partition table search program. This MBR code, also known as a boot loader, locates the selected boot partition and begins to load and execute code from the boot sector of the selected boot partition. If, on the other hand, the located bootable media is non-partitioned (e.g., a floppy disk), the BIOS looks at the same address for the non-partitioned media (e.g., the first block of data) and loads that partition's boot sector into memory. In either case, once the BIOS has found a bootable media, execution control is based on the code located in the boot sector of the bootable media.

Thus, typical electronic devices require that the boot media to be specially formatted (e.g., corrected partitioned with MBR or boot sector) in order to be recognized by the BIOS as bootable media. If the BIOS does not detect any media (e.g., hard drive, floppy disk, CD-ROM, etc.) that is correctly formatted for booting, the device will not boot. It should also be noted that the formatting required to render non-partitioned media bootable will prevent that media from being used for standard data storage.

SUMMARY OF THE INVENTION

A boot media loader method includes detecting a bootable media independent of the partitioning of the boot media. When bootable media is detected, reading appropriate data from a predetermined location of the boot media. Next, the method determines the file system type from the read data. After determining the file system type, loading boot loader code for the corresponding file system type from the basic input and output system (BIOS) code. Next, transferring device control to the previously loaded boot loader code. In an exemplary embodiment, the boot loader code is stored along with the BIOS code. In an alternate embodiment, the boot loader code is stored on the boot media itself.

An electronic device includes at least one processor. A memory is coupled to the at least one processor, and includes a series of instructions maintained thereon. When the processor executes the series of instructions, the processor detects the presence of a bootable media, for example, a floppy disk drive, a hard disk drive, a CD-ROM or other suitable device or combinations thereof. If a bootable media is detected, the processor reads data from a predetermined location on the bootable media. Next, the processor determines the file system type of the boot media from the previously read data. Then, the processor loads boot loader code for the corresponding file system type from the basic input and output system code. Then, processor transfers execution control to the loaded boot loader code.

An advantage provided by the present invention is that it expedites the boot process by eliminating the need to have a master boot record for bootable partitioned media.

Another advantage provided by the present invention is that it further expedites the boot process by eliminating the need for a boot sector in bootable, non-partitioned media.

Yet another advantage provided by the present invention is that the bootable media may be used to store data as well as providing bootable media functionality.

A feature of the present invention is that the boot loader code is stored in BIOS rather than on the boot media.

BRIEF DESCRIPTION OF THE DRAWINGS

The aforementioned and related advantages and features of the present invention will be better understood and appreciated upon review of the following detailed description of the invention, taken in conjunction with the following drawings, where like numerals represent elements, in which:

FIG. 4 is one embodiment of an algorithm that may be utilized in conjunction with certain aspects of the present invention.

DETAILED DESCRIPTION OF THE INVENTION

One aspect of the present invention is to implement a media boot loader which expedites the boot process by eliminating the need to have a master boot record (MBR) for bootable partitioned media, or in the case of bootable non-partitioned media, eliminates the need for a boot sector.

In one embodiment, boot loader code is stored in BIOS rather than on the boot media itself. The boot media may be preloaded with information that identifies its file system type (e.g., FAT12, FAT16, FAT32, etc.). Based on this information, the BIOS code may cause a corresponding processor to load and execute the corresponding boot loader code. In one embodiment, this boot loader code is loaded and executed from BIOS.

In another embodiment, control is passed to the BIOS boot loader code which, in turn, may cause the processor to load a kernel loader that is present on the boot media. This kernel loader may then load an operating system (OS) into memory. In one embodiment, execution control is passed to the operating system upon initialization.

Another aspect of the present invention is to use the aforementioned kernel loader to load the OS into memory from the boot media itself. In one embodiment, this OS is a lightweight OS that may also be used to subsequently load one or more application programs from the boot media.

Yet another aspect of the present invention is to pre-format the boot media with a file allocation table (FAT) file system, thereby enabling the boot media to be usable for non-boot related data storage. In this fashion, the boot media may be used to store data in the same manner as traditional storage media, as well as provide the functionality of a bootable media. The present invention will now be described with reference to FIGS. 1-5.

Figure 1:
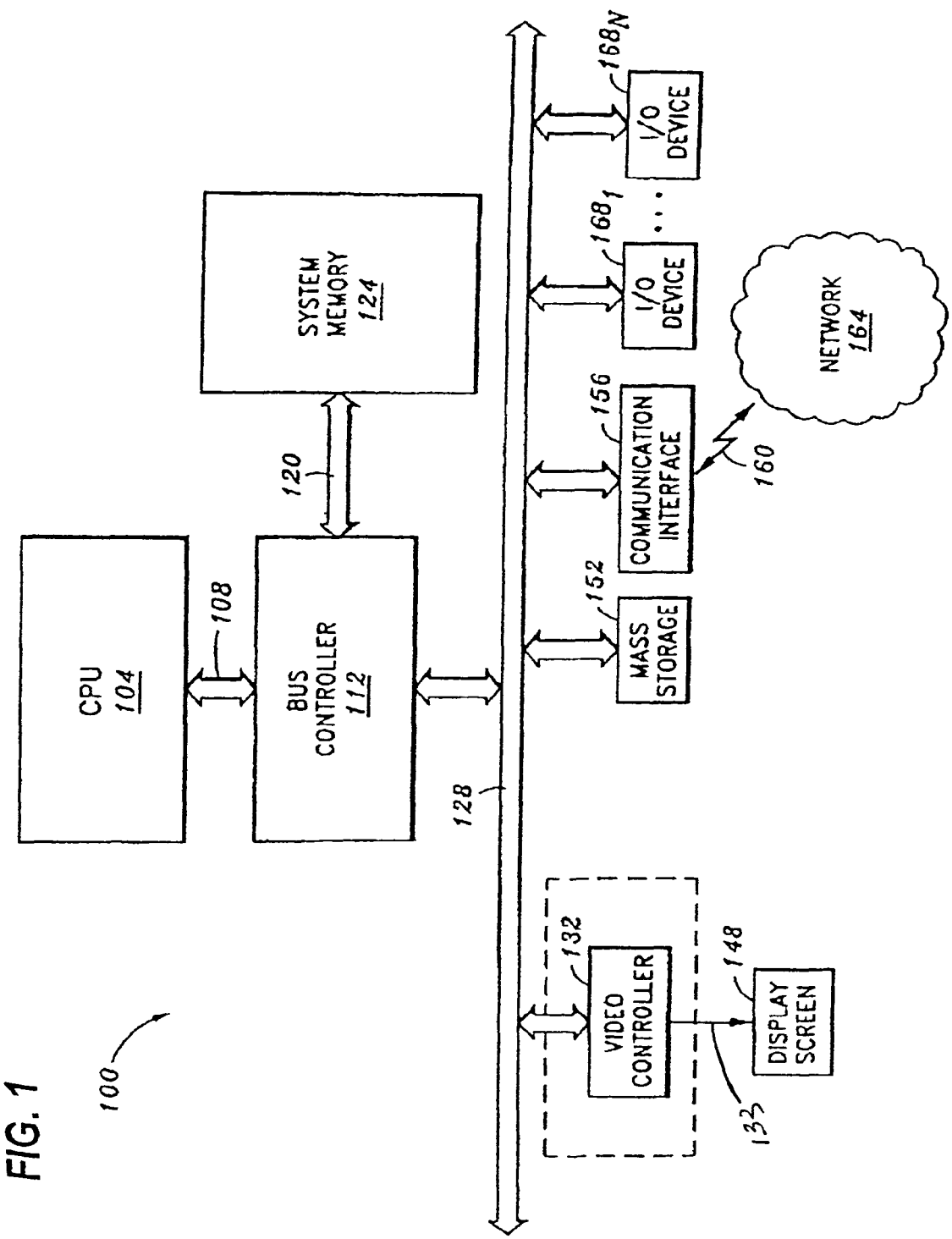
FIG. 1 is a schematic block diagram of an exemplary electronic device configured to implement one or more aspects of the present invention.

FIG. 1 is a schematic block diagram of an exemplary electronic device 100, for example, a tablet PC or other suitable device that is configured to implement one or more aspects of the present invention. Although described with reference to a tablet PC, the electronic device 100 may include, but is not limited to, general purpose computer systems (e.g., server, laptop, desktop, palmtop, personal electronic devices, etc.), personal computers (PCs), hard copy equipment (e.g., printer, plotter, fax machine, etc), or any suitable circuitry capable of processing data and combinations thereof.

The electronic device 100 includes a processor 104, for example, a central processing unit (CPU). The CPU 104 may include an Arithmetic Logic Unit (ALU) for performing computations, a collection of registers for temporary storage of data and instructions, and a control unit for controlling operation for the electronic device 100. In one embodiment, the CPU 104 includes any one of the x86, Pentium™, Pentium II™, and Pentium Pro™, Pentium Celeron™ Pentium III™, Pentium 4™, and Centrino™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™, or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessors but may take on other forms such as microcontrollers, digital signal processors, reduced instruction set computers (RISC), application specific integrated circuits, state machines and the like. Although shown with one CPU 104, the electronic device 100 may alternatively include multiple processing units.

The CPU 104 is coupled to a bus controller 112 by way of a CPU bus 108. Bus controller 112 provides an interface between the CPU 104 and memory 124 via memory bus 120. Moreover, bus controller 112 provides an interface between memory 124, CPU 104 and other devices coupled to system bus 128. It should be appreciated that memory 124 may be system memory, such as synchronous dynamic random access memory (SDRAM) or may be another form of volatile memory. It should further be appreciated that memory 124 may include non-volatile memory, such as ROM or flash memory for maintaining BIOS code, for example, that includes the boot code for implementing the present invention. System bus 128 may be a peripheral component interconnect (PCI) bus, Industry Standard Architecture (ISA) bus, etc.

Coupled to the system bus 128 are a video controller 132, a mass storage device 152, a communication interface device 156, and one or more input/output (I/O) devices $168_1$-$168_N$. The video controller 132 controls the processing and other manipulation of data 133 that is presented for display on a display screen 148, for example, a flat panel display, a CRT or any other suitable display device or combination thereof. In another embodiment, the video controller 132 is coupled to the CPU 104 through an Advanced Graphics Port (AGP) bus.

The mass storage device 152 may include, but is not limited to, a hard disc, floppy disc, CD-ROM, DVD-ROM, tape, high density floppy, high capacity removable media, low capacity removable media, solid state memory device, or any other suitable volatile or non-volatile memory device and combinations thereof. The communication interface device 156 includes a network card, a modem interface, etc. for accessing network 164 via communications link 160. The I/O devices $168_1$-$168_N$ may include a keyboard, mouse, audio/sound card, printer, and the like. The I/O devices $168_1$-$168_N$ may be disk drive, such as a compact disk drive, a digital disk drive, a tape drive, a zip drive, a jazz drive, a digital versatile disk (DVD) drive, a magneto-optical disk drive, a high density floppy drive, a high capacity removable media drive, a low capacity media device, and/or any combination thereof.

In accordance with the practices of persons skilled in the art of computer programming, the present invention is described below with reference to symbolic representations of operations that are performed by the electronic device 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in memory 124, execution of software instructions maintained, for example, in the memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" or "machine-readable medium" may include any medium that can store or transfer information. Examples of the processor readable medium include, but are not limited to, an electronic circuit, a semiconductor memory device, a ROM, a flash memory, an erasable ROM (EROM), a floppy diskette, a CD-ROM, a DVD-ROM, an optical disk, a hard disk, a fiber optic medium, a radio frequency (RF) link or any other suitable medium or combination thereof. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
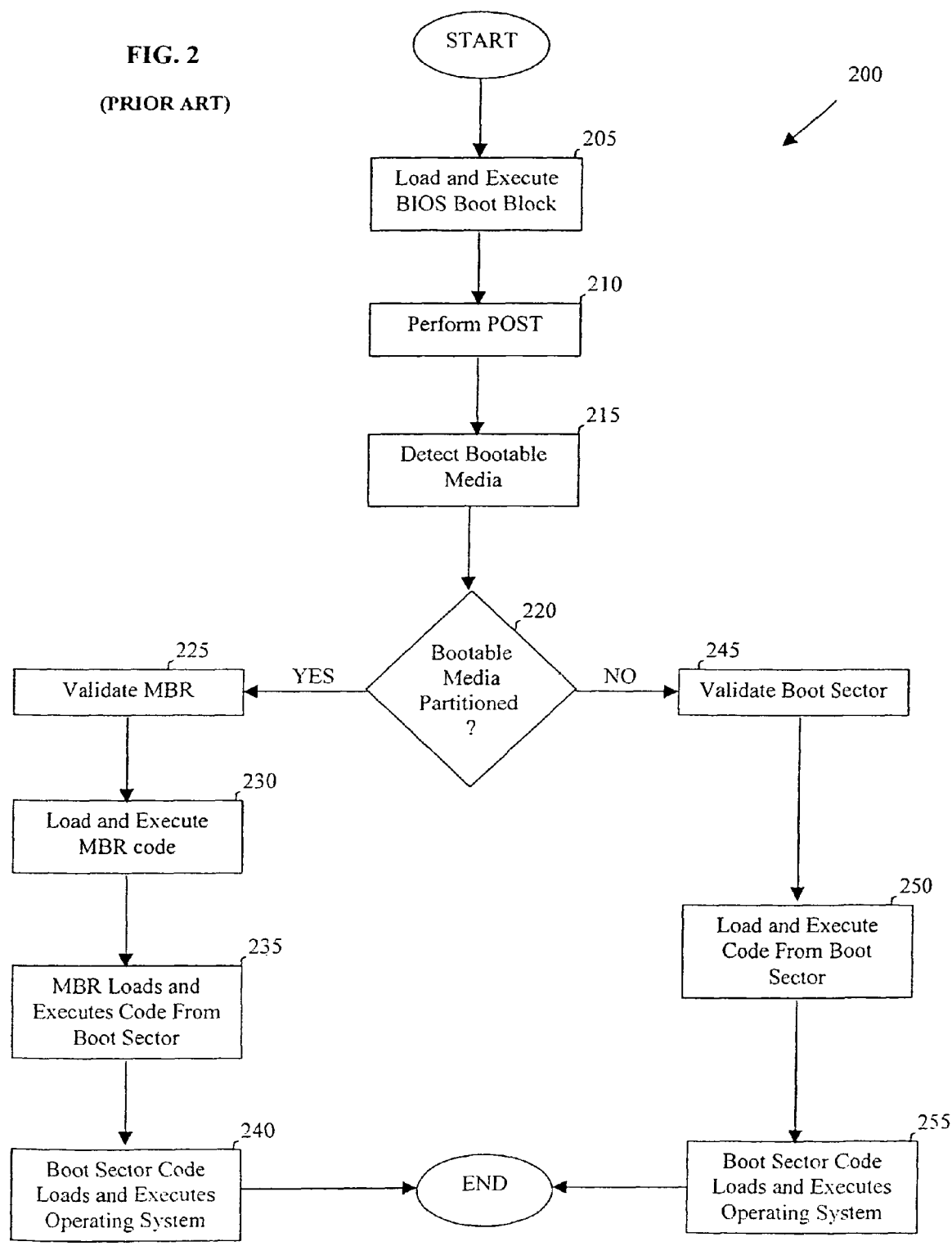
FIG. 2 is a flow diagram of a prior art boot process.

FIG. 2 is a flow chart illustrating a conventional boot process. The boot process 200 begins at step 205 with the loading and execution of the BIOS boot block.

In step 210, the BIOS then performs the POST operation and general hardware initialization.

In step 215, the BIOS code searches for and detects bootable media that may be connected to the associated device. The BIOS of FIG. 2 has often been programmed to search for bootable media in a particular order (e.g., check floppy drive first, then CD-ROM, then hard disk drive).

Once the BIOS has detected the presence of bootable media, a determination is made, in step 220, as to whether the detected bootable media is partitioned. When bootable media is partitioned (such as is the case with a hard disk drive, removable disk drive, flash, memory, etc.), the boot process proceeds to step 225 where the BIOS validates the first block of data on the bootable media (known as the Master Boot Record (MBR)). Once the MBR has been validated, in step 230 the BIOS loads and executes the MBR loader code (which it assumes is in the MBR).

In step 235, the MBR loader code loads and executes the code from the boot sector of the selected boot partition, where the boot sector is the first block of data in the selected boot partition. In step 240, the executing boot sector code loads and executes operating system initialization files.

If, on the other hand, the determination in step 220 indicates that the detected bootable media is not partitioned (e.g., such as in the case of a floppy drive), the boot process proceeds to step 245 where the BIOS may validate the first block of data on the bootable media (i.e., boot sector).

In step 250, the BIOS loads and executes code (which it assumes exists) from the boot sector. In step 255, the boot sector code then loads and executes the operating system initialization files.

Figure 3A:
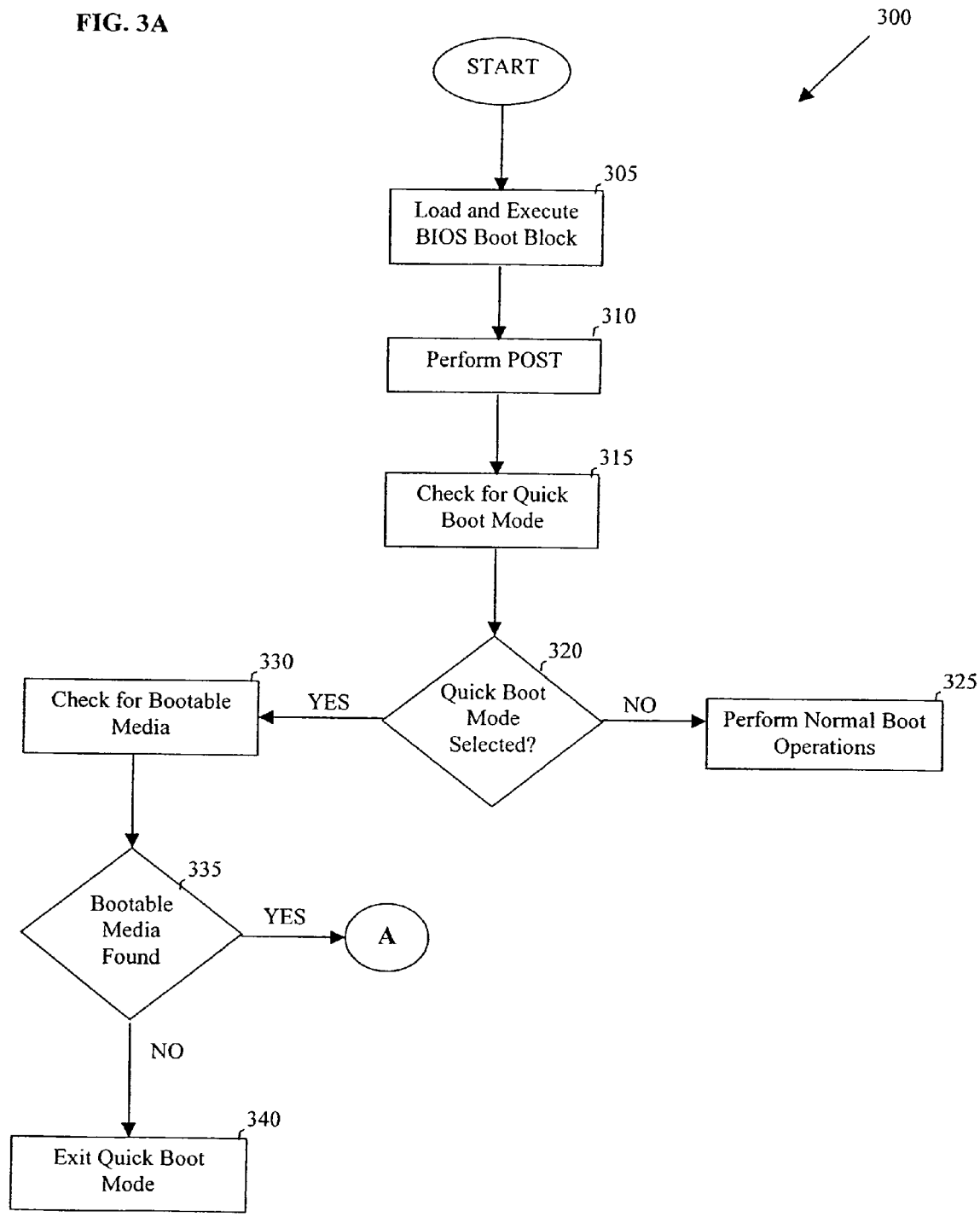
FIGS. 3A-3B are flow charts illustrating a boot process according to the one embodiment of the present invention.
Figure 3B:
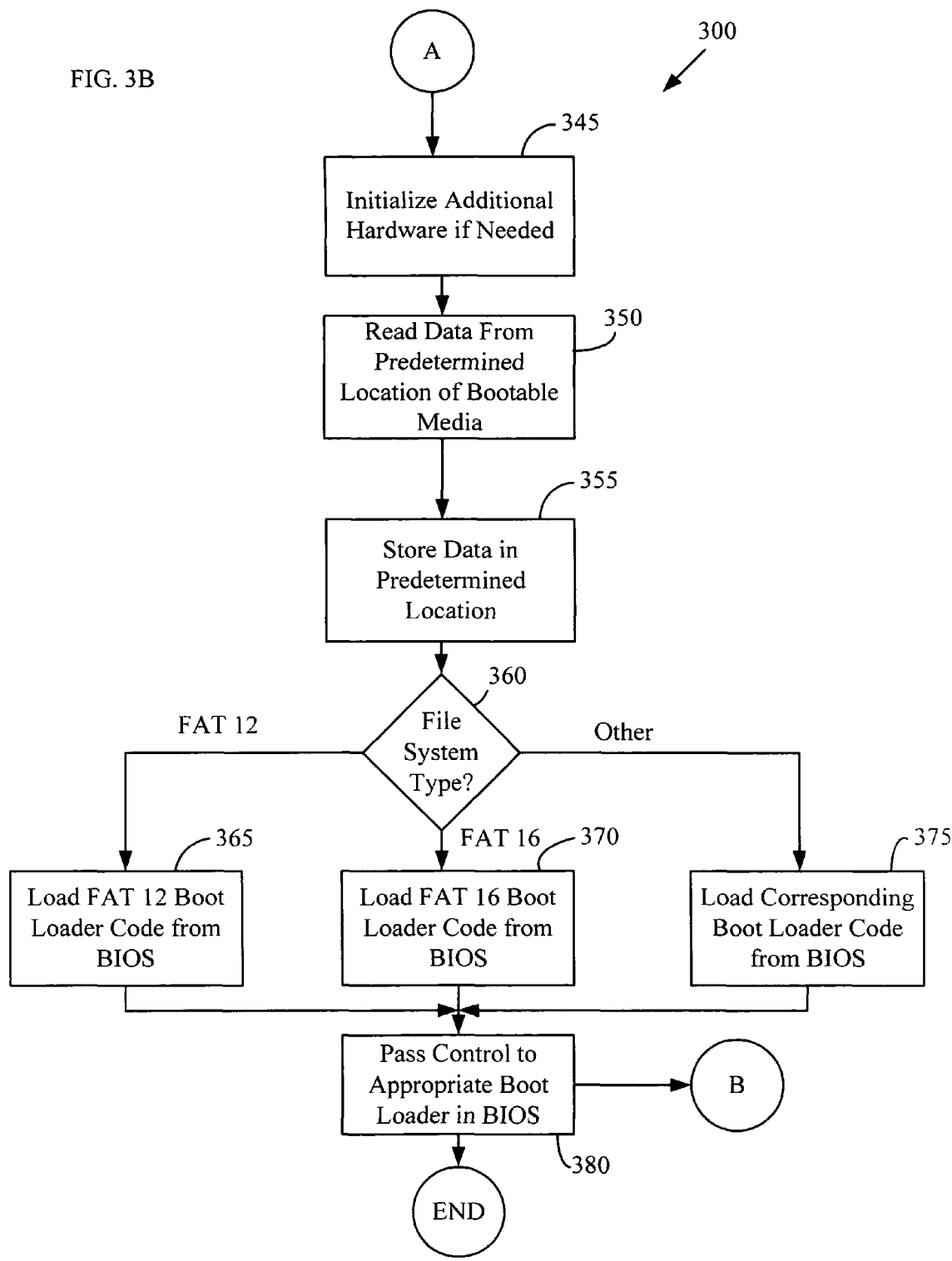

While FIG. 2 represents a conventional boot process, FIGS. 3A-3B illustrates an exemplary boot process 300 consistent with the principles of the present invention. While the electronic device 100 (FIG. 1) may employ or execute the illustrated boot process 300, it should equally be appreciated that numerous other systems and devices, each with varying configurations may also be booted according to boot process 300. The boot process starts at step 305, where the BIOS boot block is loaded and executed.

In step 310, the BIOS code may cause the processor to perform POST operations and system hardware initialization.

In step 315, the boot process then causes the processor to check if a quick boot mode has been selected. In one embodiment, the quick boot mode is determined by having BIOS poll a flag in system memory or a register of a peripheral component, for example, a switch, a hard key, soft key using a keyboard controller or other suitable I/O devices or combinations thereof.

If, in step 320, it is determined that quick boot mode has not been selected, then the BIOS code may cause the processor to perform normal boot operations in step 325. If, on the other hand, the quick boot mode has been selected, then the boot process continues to step 330 where the BIOS code checks for bootable media. It should be appreciated that the BIOS code may cause the processor to check for bootable media in a particular order (e.g., flash memory, then floppy drive, CD-ROM, then hard disk drive, etc.), or may default to check for a particular type of bootable media. While in one embodiment the particular type of bootable media is a CompactFlash® card, it should equally be appreciated that any type of non-volatile media may be used, such as Secure Digital (SD) cards, Memory Stick™, floppy disk, CD-ROM, hard disk drive, removable hard drive, USB drive, etc.

Regardless of the media type for the bootable media, in step 335, the process determines whether bootable media was found. If no bootable media was found, then boot process exits the quick boot mode in step 340. At this point, the BIOS code may cause the processor to perform the normal boot operations or may provide an error message.

Alternatively, if bootable media was found, then the process continues to step 345 of FIG. 3B where the BIOS code causes the processor to initialize any additional hardware needed to perform booting operations from the located bootable media (e.g., PCMCIA controller, VGA BIOS, etc.).

Thereafter, in step 350, the BIOS code may cause the processor 104 to read data from a predetermined location (e.g., Cylinder: 0, Head: 1, Sector: 1) of the bootable media. In one embodiment, the BIOS code causes the processor to read this data using BIOS interrupt INT13h.

In step 355, the data read in step 350 may then be stored in a predetermined memory location. In one embodiment, this memory location is 0000:7C00h, although this predetermined location could equally be located elsewhere.

In step 360, the file system type for the bootable media is determined from the previously read data. While in one embodiment, the file system type for the bootable media may be File Allocation Table (FAT) 12, FAT 16 or FAT 32, it should also be appreciated that the bootable media may also be formatted according to another file system (e.g., VFAT, HPFS, NTFS, etc.). In one embodiment, the BIOS code determines the type of file system using a predetermined algorithm, such as the algorithm illustrated in FIG. 4.

Referring back to FIG. 3B, if the bootable media's file system is found to be FAT 12, the boot process proceeds to step 365 where a FAT 12 boot loader code is loaded from BIOS to a predetermined memory location (e.g., 0:7C40 memory location). As will be described in more detail below, in one embodiment the FAT 12 boot loader code may be stored in non-volatile memory along with the BIOS code (e.g., in ROM BIOS), rather than on the bootable media itself. If, on the other hand, it is determined that the bootable media's file system type is FAT 16, then the boot process will continue to step 370 where a FAT 16 boot loader code is loaded from BIOS to a predetermined memory location. Similarly, if the data read from the boot sector of the bootable media in step 350 indicates that the file system type is of some other type (e.g., FAT 32, NTFS or other suitable file system type), then the boot process proceeds to step 375 where a corresponding boot loader program code may then be loaded from BIOS. In one embodiment, if there is no corresponding boot loader program available, the boot process would exit and normal boot operations would continue. Alternatively, the boot process may provide an error message, followed by the electronic device being rebooted.

Once the appropriate boot loader code has been loaded, the boot process may then proceed to step 380 where execution control is passed to the BIOS boot loader code. In one embodiment, the BIOS boot loader code may then proceed to boot the electronic device 100 in the traditional fashion, in which case boot process would end while the BIOS boot loader code would continue to execute from BIOS non-volatile memory. However, in another embodiment, after step 380, the boot process may proceed to process 500 of FIG. 5.

Figure 5:
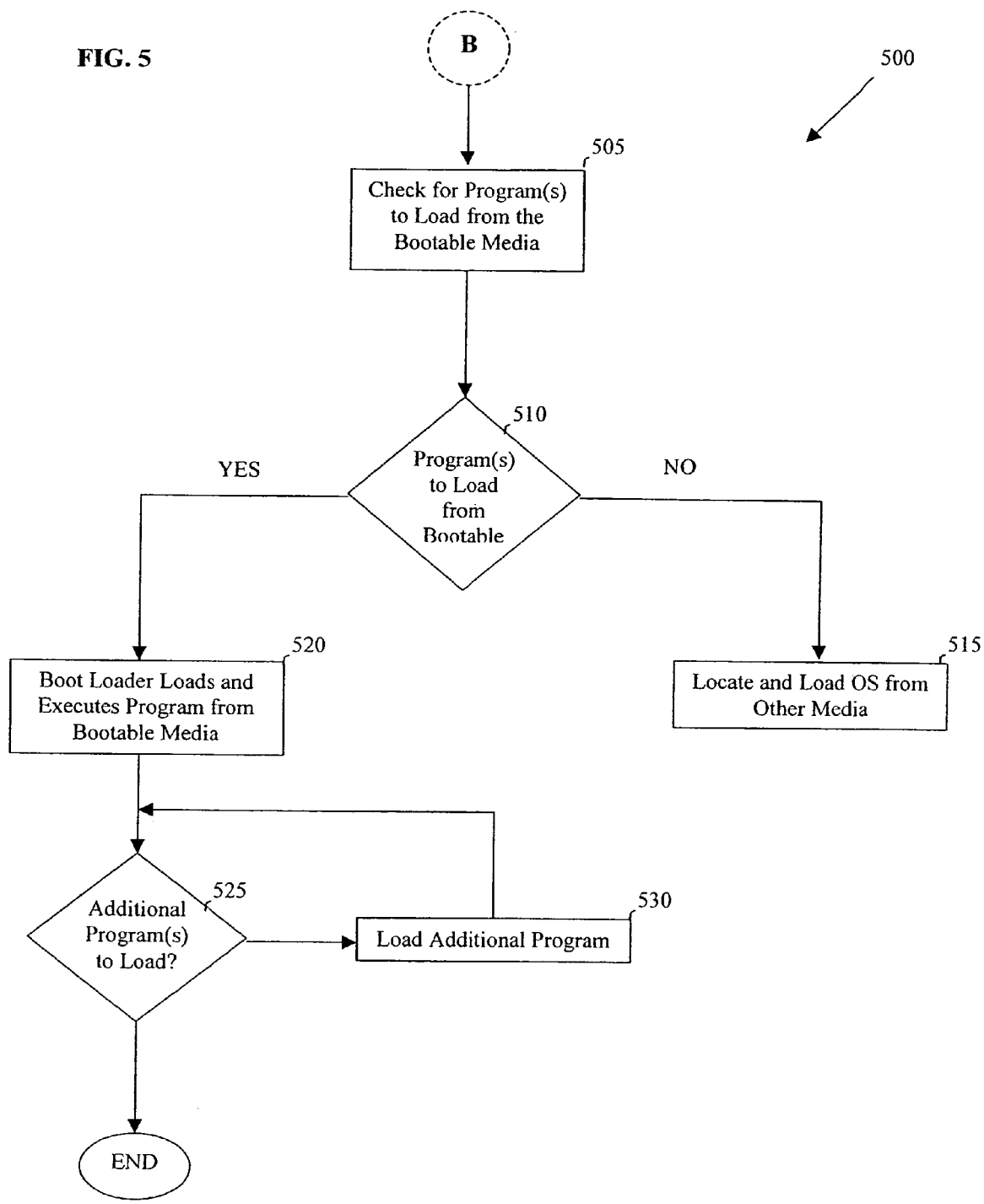
FIG. 5 is a flow chart illustrating a process of performing additional aspects of the present invention.

FIG. 5 is a flow chart illustrating the steps of process 500 which continue from where boot process 300 left off. In step 505, the BIOS boot loader code causes the processor to check for executable programs to load from the bootable media.

In step 510, if it is determined that there are no programs available on the bootable media to load, the process may then cause the processor to locate and load an operating system from some other available non-volatile media (e.g., hard drive, floppy drive, CD-ROM, etc.) in step 515.

If, on the other hand, the BIOS boot loader code causes the processor to detect the presence of executable programs on the bootable media, the process may proceed to step 520 where a kernel loader of the BIOS boot loader actually loads and executes the program from the bootable media. While in one embodiment, this program may be an operating system for device 100, it should equally be appreciated that the program may be a standalone application program. Moreover, additional programs located on the bootable media may subsequently be loaded in steps 525 and 530.

In order to be able to perform the operations described above, the BIOS code of the electronic device 100 may be pre-configured at the factory level. For example, the BIOS code used to implement process 300 (FIG. 3) and process 500 (FIG. 5), as well as the individual BIOS boot loader programs that may be called, may all be programmed at the factory level prior to user-level delivery of the electronic device 100. Alternatively, a firmware upgrade of the BIOS code for an existing device or suitable system may be undertaken to provide the functionality described above. In one embodiment, this firmware upgrade may be accomplished by having users download and execute a utility program, for example, Phoenix WinPhlash™ and/or Phoenix Phlash16™, manufactured and distributed by the assignee of the present invention or any other suitable device or combination thereof that is designed to re-program flashable memory. It should be appreciated, however, that any means known in the art for updating non-volatile memory may be used.

In a further embodiment, a single executable program may be downloaded and installed by a user where the single executable program includes both the application program(s) referred to above with reference to steps 520-530 of FIG. 5, as well as the flashable memory utility program. In this fashion, the single executable program may be used to cause the BIOS firmware upgrade to take place, as well as to install the one or more application programs onto the bootable media. It should of course be understood that more than one executable program may be similarly downloaded.

Thus, what is disclosed is a media boot loader that may be used to expedite the boot process by eliminating the need to have a master boot record (MBR) for bootable partitioned media, or in the case of bootable non-partitioned media, eliminate the need for a boot sector. With the boot loader code being stored in BIOS rather than on the bootable media itself, one aspect of the invention is to enable control to be passed to the BIOS boot loader code which, in turn, may load one or more programs into memory (e.g., an operating system (OS), standalone application programs, etc.). In another embodiment, since the bootable media does not have the special formatting or the MBR of traditional partitioned bootable media, the bootable media described herein may be used to store data as any non-bootable media would, while also being able to provide the functionality of bootable media.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A boot media loader method, said method comprising:
   causing at least one processor to determine if a fast-boot mode has been activated based on data stored in at least one memory device separate from an external bootable media, said fast-boot mode resulting in booting from said external bootable media instead of booting according to a standard boot procedure;
   upon said at least one processor determining that the fast-boot mode has been activated:
   (a) causing the at least one processor to detect bootable media independent of partitioning or type of media;
   (b) when bootable media is detected, causing the at least one processor to read data from a predetermined location of the bootable media;
   (c) causing the at least one processor to determine a file system type of a file system of the detected bootable media from the read data;
   (d) causing the at least one processor to load designated boot loader code associated with the corresponding file system type from basic input and output system code; and
   (e) causing the at least one processor to transfer execution control to the loaded boot loader code; and
   upon said at least one processor determining that the fast-boot mode has not been activated, causing the at least one processor to load default boot loader code to perform the standard boot procedure.

2. The method of claim 1, further comprising storing the designated boot loader code in a predetermined memory location for loading by the basic input and output system code.

3. The method of claim 2, further comprising storing the designated boot loader code in a same memory location as the basic input and output system code.

4. The method of claim 1, further comprising storing the designated boot loader code in association with the basic input and output system code.

5. The method of claim 1, wherein the file system type includes at least one selected from the group consisting of: FAT, VFAT, HPFS and NTFS.

6. The method of claim 1, further comprising, if no designated boot loader code associated with the corresponding file system type is available, causing the at least one processor to provide an error message.

7. The method of claim 1, further comprising, if no designated boot loader code associated with the corresponding file system type is available, causing the at least one processor to load the default boot loader code to perform the standard boot procedure.

8. The method of claim 1, further comprising causing the at least one processor to detect, based on the designated boot loader code, the presence of executable program code to load from the bootable media.

9. The method of claim 8, further comprising causing the at least one processor to load and execute the detected executable program code.

10. The method of claim 8, wherein the executable program code includes code indicative of an operating system.

11. An electronic device, said device comprising:
    a processor;
    a memory, coupled to the processor, the memory including a plurality of instructions which, when executed by the processor, cause the processor to:
    determine if a fast-boot mode has been activated based on data stored in at least one memory device separate from an external bootable media, said fast-boot mode resulting in booting from said external bootable media instead of booting according to a standard boot procedure,
    upon determining that the fast-boot mode has been activated:
    (a) detect bootable media independent of partitioning or type of media,
    (b) when bootable media is detected, read data from a predetermined location of the bootable media, (c) determine a file system type of a file system of the detected bootable media from the read data, (d) load designated boot loader code associated with the corresponding file system type from basic input and output system code, and (e) transfer device execution control to the boot loader code, and upon determining that the fast-boot has not been activated, load default boot loader code to perform the standard boot procedure.

12. The electronic device of claim 11, wherein the instructions further cause the processor to store the designated boot loader code in a predetermined memory location for loading by the basic input and output system code.

13. The electronic device of claim 12, wherein the instructions further cause the processor to store the designated boot loader code in a same memory location as the basic input and output system code.

14. The electronic device of claim 11, wherein the instructions further cause the processor to store the designated boot loader code in association with the basic input and output system code.

15. The electronic device of claim 11, wherein the instructions further cause the processor to provide an error message when no boot loader code associated with the corresponding file system type is available.

16. The electronic device of claim 11, wherein the instructions further cause the processor to load the default boot loader code to perform the standard boot procedure when no designated boot loader code associated with the corresponding file system type is available.

17. The electronic device of claim 11, wherein the instructions further cause the processor to detect, based on the designated boot loader code, the presence of executable program code to load from the bootable media.

18. The electronic device of claim 17, wherein the instructions further cause the processor to load and execute the detected executable program code.

19. The electronic device of claim 17, wherein the executable program code includes code indicative of an operating system.

20. A computer program stored in a non-transitory computer readable medium for providing a media boot loader, said computer program comprising:

a code segment for determining if a fast-boot mode has been activated based on data stored in at least one memory device separate from an external bootable media, said fast-boot mode resulting in booting from said external bootable media instead of booting according to a standard boot procedure;

a code segment for, upon determining that the fast-boot mode has been activated, detecting bootable media independent of partitioning or type of media;

a code segment for, upon determining that the fast-boot mode has been activated and when bootable media is detected, reading data from a predetermined location of the bootable media;

a code segment for, upon determining that the fast-boot mode has been activated, determining a file system type of a file system of the detected bootable media from the read data;

a code segment for, upon determining that the fast-boot mode has been activated, loading designated boot loader code associated with the corresponding file system type from the basic input and output system code; and a code segment for, upon determining that the fast-boot mode has been activated, transferring execution control to the boot loader code; and a code segment for, upon determining that the fast-boot mode has not been activated, loading default boot loader code to perform the standard boot procedure.

* * * * *